(12) United States Patent
Kim et al.

(10) Patent No.: US 9,537,331 B2
(45) Date of Patent: Jan. 3, 2017

(54) BATTERY PACK

(75) Inventors: Bongyoung Kim, Yongin-si (KR); Kiho Shin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 879 days.

(21) Appl. No.: 13/418,089

(22) Filed: Mar. 12, 2012

(65) Prior Publication Data

US 2012/0293128 A1 Nov. 22, 2012

(30) Foreign Application Priority Data

May 18, 2011 (KR) .......................... 10-2011-0046830

(51) Int. Cl.
*H02J 7/00* (2006.01)

(52) U.S. Cl.
CPC .................................... *H02J 7/0016* (2013.01)

(58) Field of Classification Search
CPC .................................................... H01M 10/44
USPC ......................................... 320/110, 116–117
See application file for complete search history.

(56) References Cited

U.S. PATENT DOCUMENTS

| 6,741,065 | B1 * | 5/2004 | Ishii | B60L 11/1816 |
| | | | | 320/122 |
| 2001/0026147 | A1 * | 10/2001 | Nakashimo | H02J 7/0031 |
| | | | | 320/134 |
| 2002/0195994 | A1 * | 12/2002 | Perelle | B60L 3/0046 |
| | | | | 320/116 |
| 2004/0113585 | A1 * | 6/2004 | Stanesti | H02J 7/0018 |
| | | | | 320/116 |
| 2006/0103353 | A1 * | 5/2006 | Kim | G06F 1/26 |
| | | | | 320/128 |
| 2011/0001442 | A1 * | 1/2011 | Lee | B62M 6/45 |
| | | | | 318/139 |
| 2011/0193525 | A1 | 8/2011 | Ro | |

FOREIGN PATENT DOCUMENTS

| JP | 2001-283932 | 10/2001 |
| KR | 10-1997-0054772 | 7/1997 |
| KR | 10-2003-0004617 A | 1/2003 |
| KR | 10-2003-0089445 A | 11/2003 |
| KR | 10-0478832 B1 | 3/2005 |

(Continued)

OTHER PUBLICATIONS

KIPO Office action dated Sep. 20, 2010, for Korean priority Patent application 10-2011-0046830, (3 pages).

(Continued)

*Primary Examiner* — Drew A Dunn
*Assistant Examiner* — Zixuan Zhou
(74) *Attorney, Agent, or Firm* — Lewis Roca Rothgerber Christie LLP

(57) ABSTRACT

A battery pack is provided. In one embodiment, the battery pack includes a plurality of battery units each including at least one battery cell, a charge switch unit for connecting the plurality of battery units in parallel to form a charge path, a discharge switch unit for connecting the plurality of battery units in series to form a discharge path, and a battery management unit for controlling switching of the charge switch unit and the discharge switch unit according to a standby mode, a charge mode, a and discharge mode of the battery pack. The switching is controlled with a delay time associated with each of combinations of mode conversion between the modes.

13 Claims, 4 Drawing Sheets

(56) References Cited

FOREIGN PATENT DOCUMENTS

KR         10-0867803 B1    11/2008
KR   10-2011-0093023 A    8/2011

OTHER PUBLICATIONS

Korean Patent Abstract No. 10-2003-0096979 A, published Dec. 31, 2003 for KR 10-0478832 B1 listed above; 2 pages.
Korean Patent Abstract No. 10-2008-0053713 A, published Jun. 6, 2008 for KR 10-0867803 B1 listed above, 2 pages.

* cited by examiner

BATTERY PACK

CROSS-REFERENCE TO RELATED APPLICATION

This application claims priority to and the benefit of Korean Patent Application No. 10-2011-0046830, filed on May 18, 2011, the entire content of which is incorporated herein by reference.

BACKGROUND

1. Field

Aspects of embodiments of the present invention relate to a battery pack.

2. Description of the Related Art

A secondary battery may be used as a power source of a portable electronic device such as a cellular phone, a notebook computer, a camcorder, or a personal digital assistant (PDA). A second battery may even be used as a power source of a home vacuum cleaner. A motor of a general home vacuum cleaner is driven using an AC power source for home use. However, when the AC power source is unavailable, a separate power source can power the home vacuum cleaner. The secondary battery used as the portable power source may require a high-output power of 100V or higher according to the design specification.

SUMMARY

Aspects of embodiments of the present invention are directed toward a battery pack capable of high-efficiency charging and high-output discharging.

In an exemplary embodiment according to the present invention, a battery pack is provided. The battery pack includes a plurality of battery units each including at least one battery cell, a charge switch unit for connecting the plurality of battery units in parallel to form a charge path, a discharge switch unit for connecting the plurality of battery units in series to form a discharge path, and a battery management unit for controlling switching of the charge switch unit and the discharge switch unit according to a standby mode, a charge mode, and a discharge mode of the battery pack. The switching is controlled with a delay time associated with each of combinations of mode conversion between the modes.

Each of the plurality of battery units may further include a plurality of battery cells connected in series.

The charge switch unit may include one or more first charge switches connected between negative electrode terminals of respective ones of the plurality of battery units and a negative electrode terminal of the battery pack, and a plurality of second charge switches connected between a positive electrode charge terminal of the battery pack and positive electrode terminals of respective ones of the plurality of battery units.

The battery management unit may be configured to convert the battery pack from the standby mode to the charge mode by performing a first switching operation to turn on the one or more first charge switches, and performing a second switching operation to turn on the plurality of second charge switches. A delay time may be between the first switching operation and the second switching operation.

The discharge switch unit may include one or more first discharge switches connected between a positive electrode terminal of respective ones of the plurality of battery units and a negative electrode terminal of respective neighboring ones of the plurality of battery units, and a second discharge switch connected between a positive electrode terminal of one having a highest potential among the battery units connected in series, and a positive electrode discharge terminal of the battery pack.

The battery management unit may be configured to convert the battery pack from the standby mode to the discharge mode by performing one or more first switching operations to sequentially turn on the respective one or more first discharge switches, and performing a second switching operation to turn on the second discharge switch. A delay time may be between the first switching operations and the second switching operation, and between consecutive ones of the first switching operations sequentially performed on the respective one or more first discharge switches.

The battery management unit may be configured to convert the battery pack from the discharge mode to the charge mode by performing a first switching operation to turn off the second discharge switch, performing one or more second switching operations to sequentially turn off the respective one or more first discharge switches, performing a third switching operation to turn on the one or more first charge switches, and performing a fourth switching operation to turn on the plurality of second charge switches. A delay time may be between consecutives ones of the first to fourth switching operations, and between consecutive ones of the second switching operations sequentially performed on the respective one or more first discharge switches.

The battery management unit may be configured to convert the battery pack from the charge mode to the discharge mode by performing a first switching operation to turn off the plurality of second charge switches, performing a second switching operation to turn off the one or more first charge switches, performing one or more third switching operations to sequentially turn on the respective one or more first discharge switches, and performing a fourth switching operation to turn on the second discharge switch. A delay time may be between consecutive ones of the first to fourth switching operations, and between consecutive ones of the third switching operations sequentially performed on the respective one or more first discharge switches.

The battery management unit may be configured to turn off the second discharge switch when the plurality of battery units is over-discharged.

The battery management unit may be configured to turn off the plurality of second charge switches when the plurality of battery units is over-charged.

The discharge switch unit may include one or more first discharge switches connected between a positive electrode terminal of respective ones of the plurality of battery units and a negative electrode terminal of respective neighboring ones of the plurality of battery units, and a second discharge switch connected between a positive electrode terminal of one among the battery units connected in series having a highest potential, and a positive electrode discharge terminal of the battery pack.

The battery management unit may be configured to convert the battery pack from the standby mode to the discharge mode by performing one or more first switching operations to sequentially turn on the respective one or more first discharge switches, and performing a second switching operation to turn on the second discharge switch. A delay time may be between the first switching operations and the second switching operation, and between consecutive ones of the first switching operations sequentially performed on the respective one or more first discharge switches.

The battery management unit may be configured to turn off the second discharge switch when the plurality of battery units is over-discharged.

As described above, embodiments of the present invention provide for a battery pack capable of high-efficiency charging and high-output discharging. Additional aspects and/or features of the present invention will be set forth in part in the description that follows and, in part, will be obvious to one of ordinary skill from the description, or may be learned by practice of embodiments of the invention.

BRIEF DESCRIPTION OF THE DRAWINGS

Aspects and features of the present invention will be more apparent from the following detailed description in conjunction with the accompanying drawings, in which.

DETAILED DESCRIPTION

Example embodiments will now be described more fully hereinafter with reference to the accompanying drawings; however, the present invention may be embodied in different forms and should not be construed as limited to the embodiments set forth herein. These embodiments are provided to aid with understanding this disclosure, and to help convey the scope of the present invention to those skilled in the art.

Hereinafter, a configuration of a battery pack 100 according to an embodiment of the present invention will be described in detail with reference to the accompanying drawings.

Figure 1:
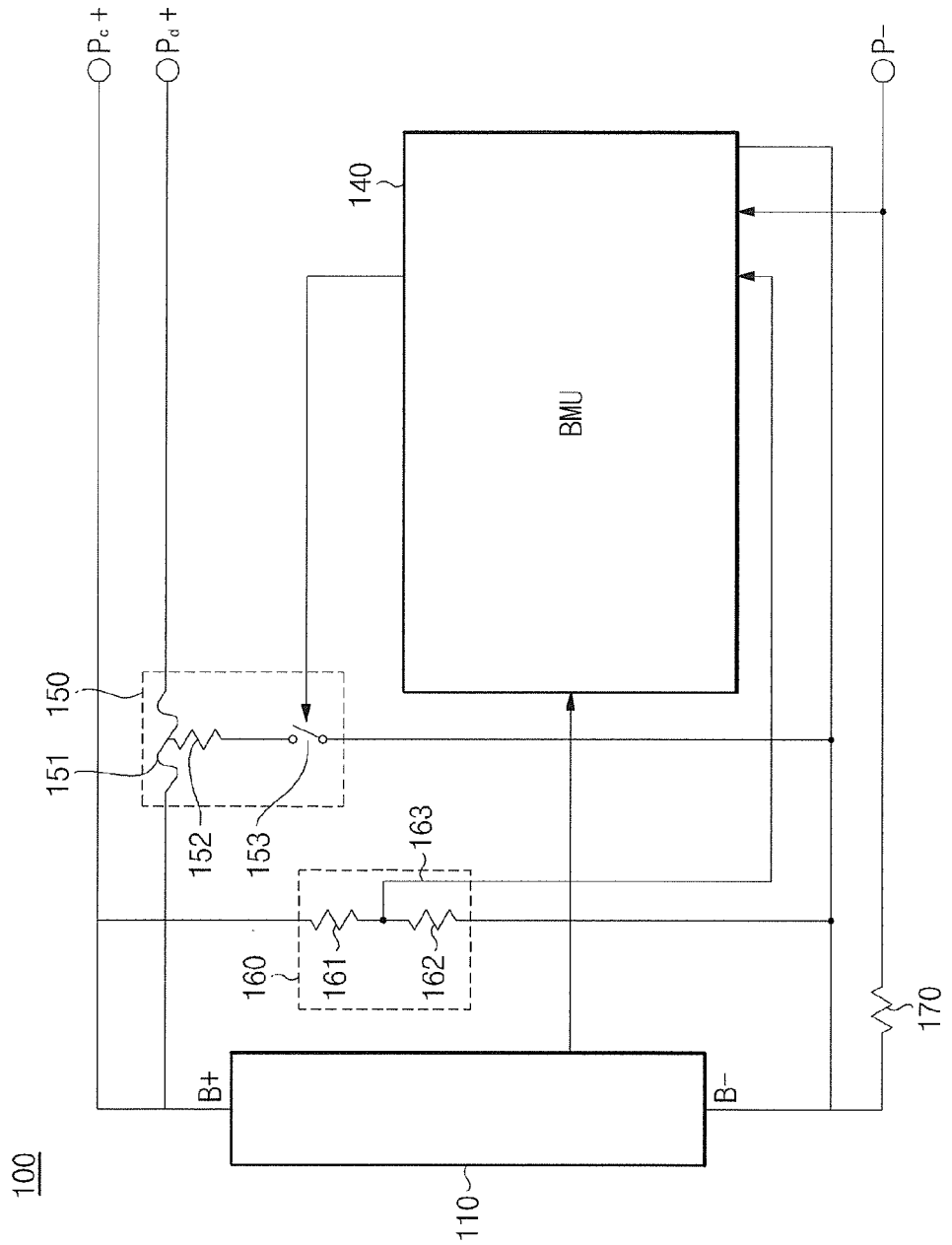
FIG. 1 is a circuit view of a battery pack according to an embodiment of the present invention.
Figure 2:
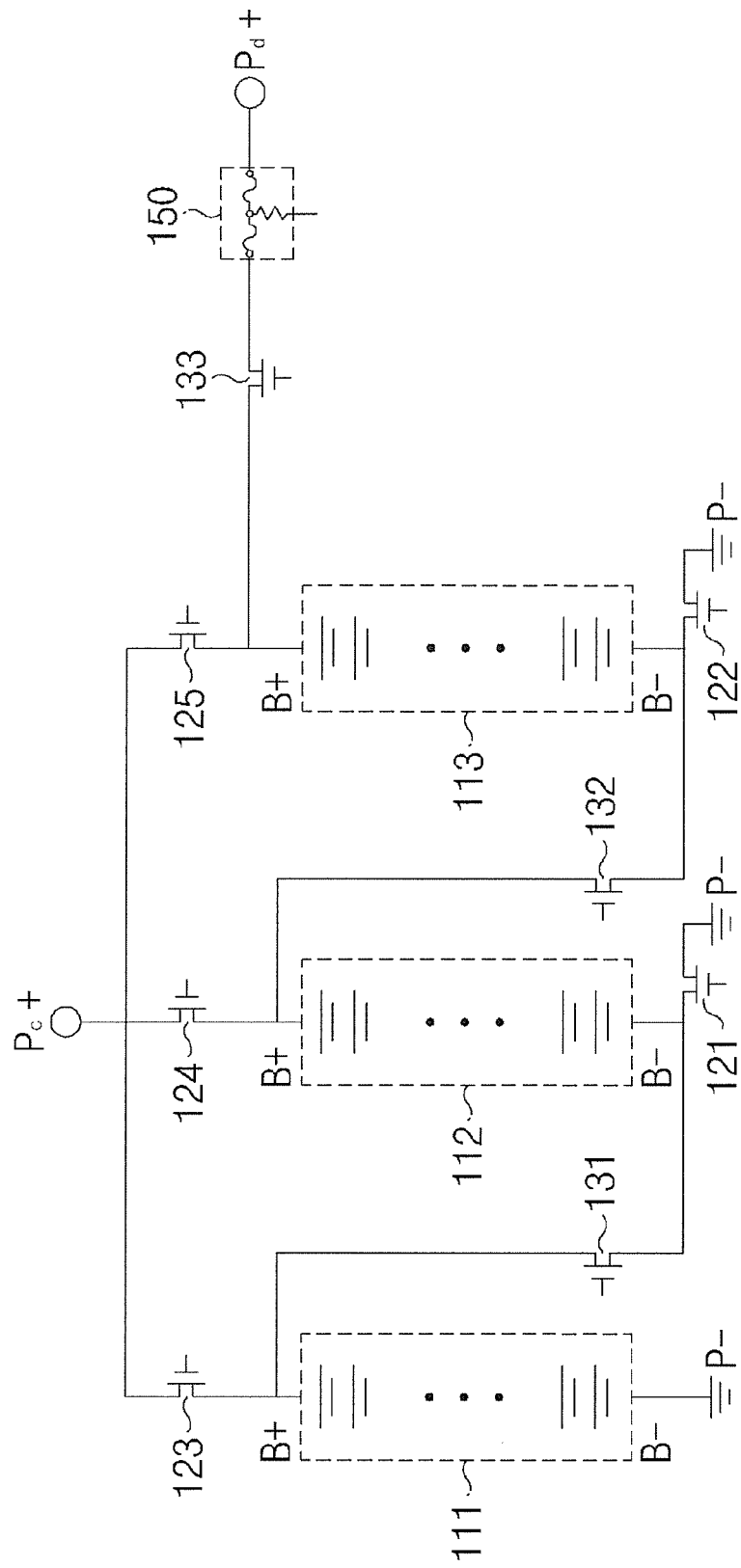
FIG. 2 is a circuit view illustrating battery units, charge switch units, and discharge switch units according to an embodiment of the present invention.

FIG. 1 is a circuit view of the battery pack 100. FIG. 2 is a circuit view illustrating battery units 111, 112, and 113, charge switch units 121, 122, 123, 124, and 125, and discharge switch units 131, 132, and 133, according to an embodiment of the present invention.

Referring to FIGS. 1 and 2, the battery pack 100 includes a plurality of battery units 110 (illustrated in FIG. 2 as battery units 111, 112, and 113), and battery charge/discharge components 121, 122, 123, 124, 125, 131, 132, 133, and 140. In addition, the battery pack 100 includes a positive electrode discharge terminal Pd+, a positive electrode charge terminal Pc+, and a negative electrode terminal P−. In the battery pack 100, a discharge operation is performed through the positive electrode discharge terminal Pd+ and the negative electrode terminal P−, and a charge operation is performed through the positive electrode charge terminal Pc+ and the negative electrode terminal P−.

Each of the battery units 110 includes one or more battery cells connected in series to each other. The battery cells may be generally at least one selected from the group consisting of lithium ion batteries, lithium polymer batteries, and equivalents thereof, but the invention is not limited to these types of batteries. While FIG. 2 shows three battery units 111, 112, and 113, the present invention is not limited thereto. The number of battery units may vary according to the specification of the device requiring power. In the following description, an embodiment of the invention will be described in detail with regard to the battery units 110 comprised of a first battery unit 111, a second battery unit 112, and a third battery unit 113.

The battery charge/discharge components 121, 122, 123, 124, 125, 131, 132, 133, and 140 include charge switch units 121, 122, 123, 124, and 125, discharge switch units 131, 132, and 133, and a battery management unit (BMU) 140. The charge switch units 121, 122, 123, 124, and 125 include first charge switches 121 and 122, and second charge switches 123, 124, and 125, and form a charge path by connecting the first to third battery units 111, 112, and 113 in parallel. The first charge switches 121 and 122 include a first first-charge switch 121 and a second first-charge switch 122, and are connected to negative electrode terminals B− of the second battery unit 112 and the third battery unit 113, respectively, and a negative electrode terminal P− of the battery pack 100, which will later be described in more detail.

The first first-charge switch 121 includes a first electrode, a second electrode, and a control electrode. The first electrode of the first first-charge switch 121 is connected to the negative electrode terminal B− of the second battery unit 112. The second electrode of the first first-charge switch 121 is connected to the negative electrode terminal P− of the battery pack 100. The control electrode of the first first-charge switch 121 is connected to the battery management unit 140 and receives a control signal from the battery management unit 140.

The second first-charge switch 122 includes a first electrode, a second electrode, and a control electrode. The first electrode of the second first-charge switch 122 is connected to the negative electrode terminal B− of the third battery unit 113. The second electrode of the second first-charge switch 122 is connected to the negative electrode terminal P− of the battery pack 100. The control electrode of the second first-charge switch 122 is connected to the battery management unit 140 and receives a control signal from the battery management unit 140.

Although not shown, a first charge switch may be optionally provided between the first battery unit 111 and the negative electrode terminal P− of the battery pack 100.

The second charge switches 123, 124, and 125 include a first second-charge switch 123, a second second-charge switch 124, and a third second-charge switch 125, and are connected to a positive electrode charge terminal Pc+ of the battery pack 100 and positive electrode terminals B+ of the first battery unit 111, the second battery unit 112, and the third battery unit 113, respectively, which will later be described in more detail.

The first second-charge switch 123 includes a first electrode, a second electrode, and a control electrode. The first electrode of the first second-charge switch 123 is connected to the positive electrode charge terminal Pc+ of the battery pack 100. The second electrode of the first second-charge switch 123 is connected to the positive electrode terminal B+ of the first battery unit 111. The control electrode of the first second-charge switch 123 is connected to the battery management unit 140 and receives a control signal from the battery management unit 140.

The second second-charge switch 124 includes a first electrode, a second electrode, and a control electrode. The first electrode of the second second-charge switch 124 is connected to the positive electrode charge terminal Pc+ of the battery pack 100. The second electrode of the second second-charge switch 124 is connected to the positive electrode terminal B+ of the second battery unit 112. The control electrode of the second second-charge switch 124 is connected to the battery management unit 140 and receives a control signal from the battery management unit 140.

The third second-charge switch 125 includes a first electrode, a second electrode, and a control electrode. The first electrode of the third second-charge switch 125 is connected to the positive electrode charge terminal Pc+ of the battery pack 100. The second electrode of the third second-charge switch 125 is connected to the positive electrode terminal B+ of the third battery unit 113. The control electrode of the third second-charge switch 125 is connected to the battery management unit 140 and receives a control signal from the battery management unit 140.

The discharge switch units 131, 132, and 133 include first discharge switches 131 and 132, and a second discharge switch 133, and form a discharge path by connecting the first to third battery units 111, 112, and 113 in series.

The first discharge switches 131 and 132 include a first first-discharge switch 131 and a second first-discharge switch 132, and are connected between positive electrode terminals B+ and negative electrode terminals B− of neighboring battery units, respectively, which will now be described in more detail.

The first first-discharge switch 131 includes a first electrode, a second electrode, and a control electrode. The first electrode of the first first-discharge switch 131 is connected to the positive electrode terminal B+ of the first battery unit 111. The second electrode of the first first-discharge switch 131 is connected to the negative electrode terminal B− of the second battery unit 112. The control electrode of the first first-discharge switch 131 is connected to the battery management unit 140 and receives a control signal from the battery management unit 140.

The second first-discharge switch 132 includes a first electrode, a second electrode, and a control electrode. The first electrode of the second first-discharge switch 132 is connected to the positive electrode terminal B+ of the second battery unit 112. The second electrode of the second first-discharge switch 132 is connected to the negative electrode terminal B− of the third battery unit 113. The control electrode of the second first-discharge switch 132 is connected to the battery management unit 140 and receives a control signal from the battery management unit 140.

When the first to third battery units 111, 112, and 113 are connected to each other in series by the first discharge switches 131 and 132, the second discharge switch 133 is connected between the one of the positive electrode terminals B+ of the first to third battery units 111, 112, and 113 that has the highest potential (e.g., third battery 113 in the embodiment of FIG. 2) and the positive electrode discharge terminal Pd+ of the battery pack 100, which will now be described in more detail.

The second discharge switch 133 includes a first electrode, a second electrode, and a control electrode. The first electrode of the second discharge switch 133 is connected to the positive electrode terminal B+ of the third battery unit 113. Here, when the first to third battery units 111, 112, and 113 are connected to each other in series, the positive electrode terminal B+ of the third battery unit 113 is a terminal having the highest potential and serves as the positive electrode terminal B+ of the overall plurality of battery units 110, so the first electrode of the second discharge switch 133 is connected in one embodiment to the positive electrode terminal B+ of the third battery unit 113. The second electrode of the second discharge switch 133 is connected to the positive electrode discharge terminal Pd+ of the battery pack 100. Here, an over-discharge preventing unit 150 may be provided between the second electrode of the second discharge switch 133 and the positive electrode discharge terminal Pd+ of the battery pack 100. The control electrode of the second discharge switch 133 is connected to the battery management unit 140 and receives a control signal from the battery management unit 140.

The battery management unit 140 is connected to the control electrodes of switches included in the charge switch units 121, 122, 123, 124, and 125 and the discharge switch units 131, 132, and 133. Therefore, the battery management unit 140 controls switching operations of the switches included in the charge switch units 121, 122, 123, 124, and 125 and the discharge switch units 131, 132, and 133 according to a standby mode, a charge mode, and a discharge mode of the battery pack 100. In addition, the battery management unit 140 controls mode conversion between each of the combinations of modes with a delay time (for example, a predetermined delay time) associated with each of the combinations of modes.

Further, the battery management unit 140 performs overall management of charging and discharging of the battery pack 100 by measuring the voltage of the battery units 110. The following description of an exemplary embodiment of the present invention will focus on, among various functions of the battery management unit 140, a function of managing the charging and discharging of the battery units 111, 112, and 113 by controlling the charge switch units 121, 122, 123, 124, and 125, and the discharge switch units 131, 132, and 133.

In addition to the aforementioned configuration, the battery pack 100 according to an embodiment of the present invention may include an over-discharge preventing unit 150, an overall cell voltage sensing unit 160, and a current sensor 170.

The over-discharge preventing unit 150 includes a fuse 151, a heating resistor 152, and a fuse switch 153. The fuse 151 is connected between the positive electrode terminal B+ of the battery units 110 and the positive electrode discharge terminal Pd+ of the battery pack 100. In addition, the heating resistor 152 is connected to the fuse 151. Further, the fuse switch 153 is connected between the fuse 151 and the negative electrode terminal B− of the battery units 110. The fuse switch 153 is controlled by the battery management unit 140. Thus, when the battery management unit 140 outputs a control signal, the fuse switch 153 is turned on. Then, heat is generated from the heating resistor 152, and the fuse 151 is cut off by the generated heat. Accordingly, over-discharge of the battery units 110 can be prevented.

The overall cell voltage sensing unit 160 is comprised of a first resistor 161 and a second resistor 162, and senses a voltage of the battery units 110. In an exemplary embodiment, the overall cell voltage sensing unit 160 includes a first resistor 161 and a second resistor 162 connected in series to each other between the negative electrode terminal B− of the battery unit 110 having the lowest potential and the positive electrode terminal B+ of the battery unit 110 having the highest potential. In addition, a voltage divider wire 163 is connected to a node between the first resistor 161 and the second resistor 162. The voltage divider wire 163 is connected to the battery management unit 140.

The current sensor 170 is connected to the battery management unit 140 and senses a current flowing in the battery units 110. Since the current sensor 170 operates in a manner that is well known to one skilled in the art, a detailed explanation will not be given.

The operation of the battery pack 100 of FIGS. 1-2 in the standby mode, the charge mode, and the discharge mode will now be described in detail with reference to FIGS. 3-4.

Figure 3:
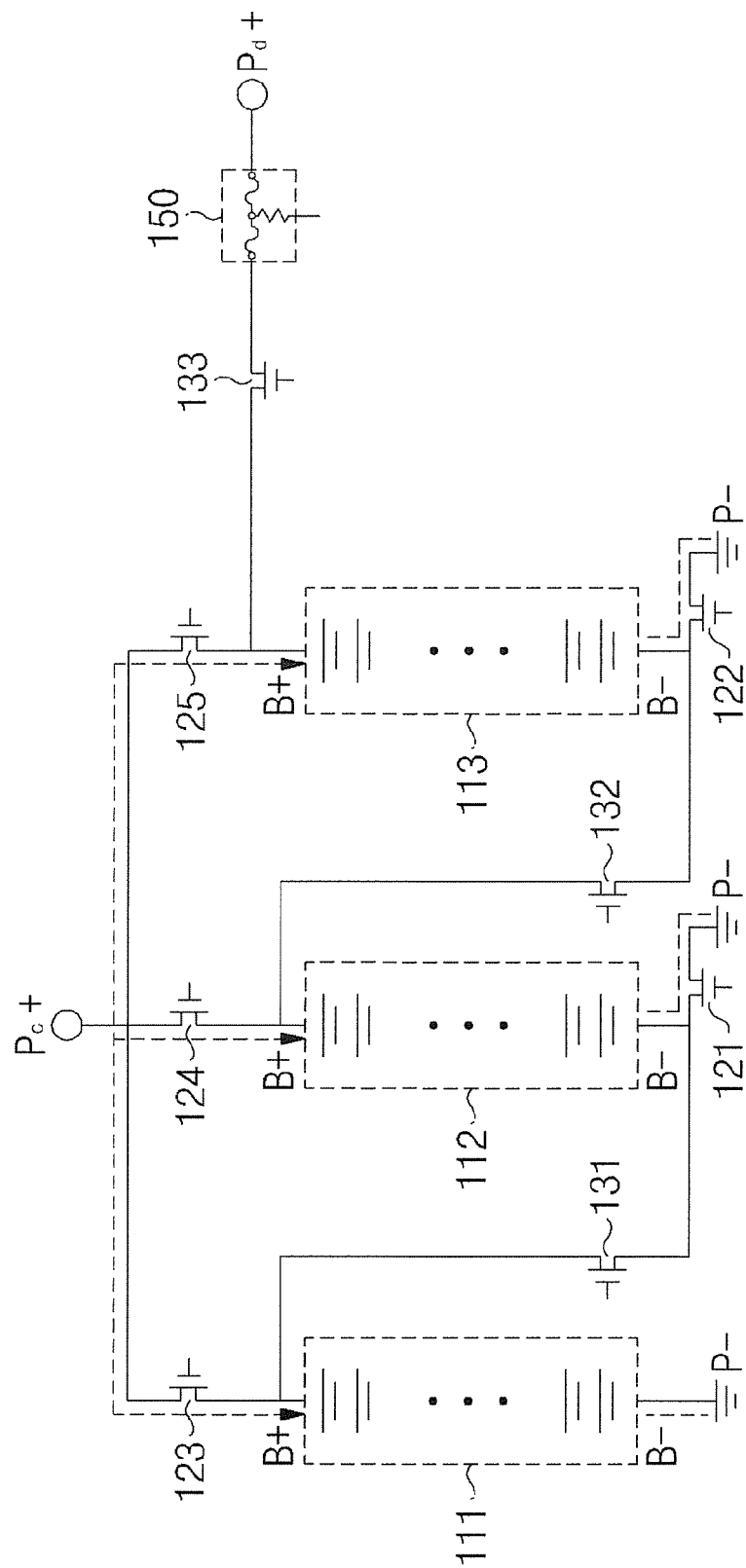
FIG. 3 illustrates a charging mode of the battery pack shown in FIGS. 1-2.
Figure 4:
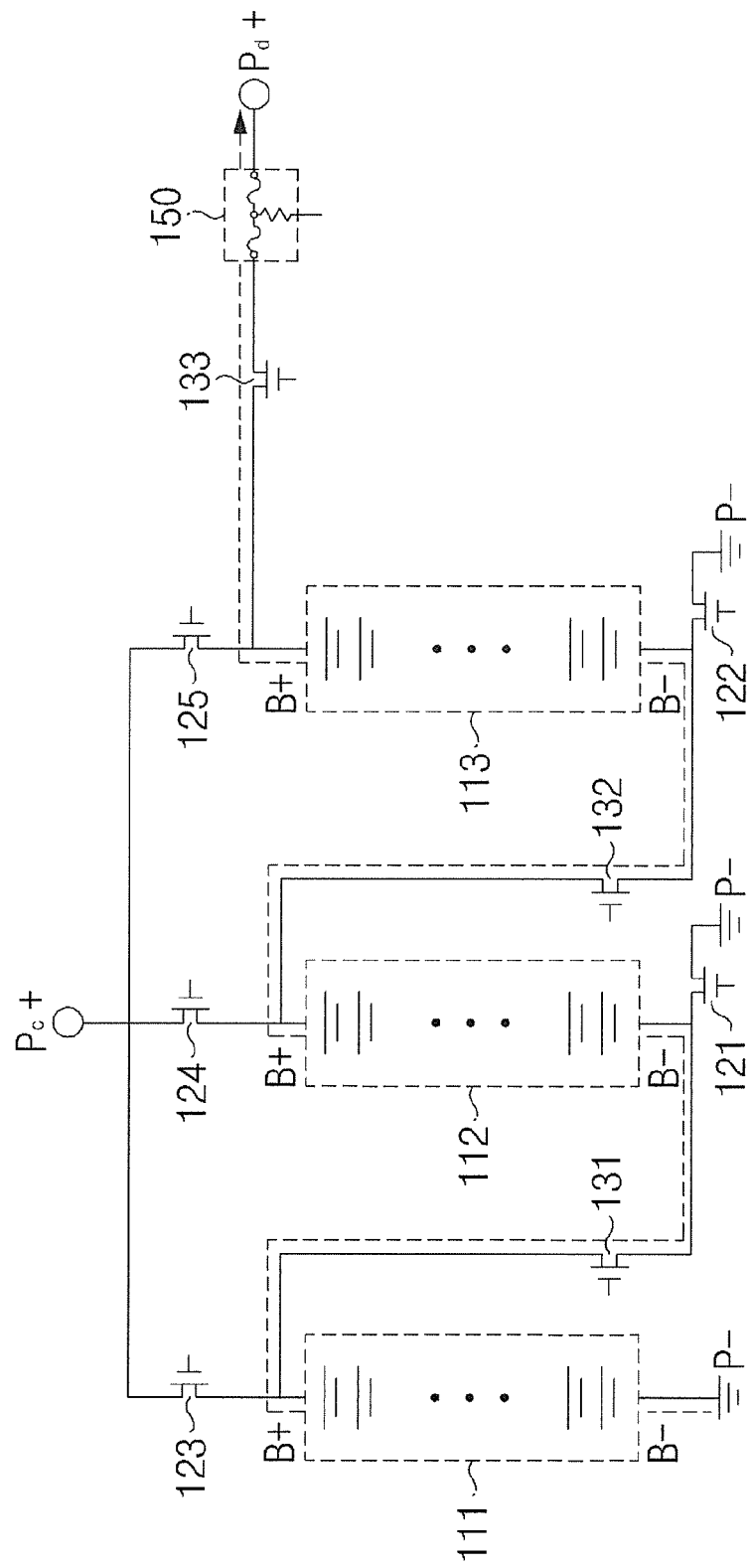
FIG. 4 illustrates a discharging mode of the battery pack shown in FIGS. 1-2.

FIG. 3 illustrates a charging mode of the battery pack shown in FIGS. 1-2, and FIG. 4 illustrates a discharging mode of the battery pack shown in FIGS. 1-2.

First, charging or discharging is not performed in the standby mode of the battery pack 100. Therefore, in the standby mode, in order to reduce or minimize power consumption, the battery management unit 140 turns off all of the charge switch units 121, 122, 123, 124, and 125 and the discharge switch units 131, 132, and 133.

Next, conversion from the standby mode to the charge mode will be described with reference to FIG. 3. First, the battery management unit 140 concurrently (for example, simultaneously) turns on the first first-charge switch 121 and the second first-charge switch 122. Then, after a delay time (for example, a delay time of approximately 500 ms or less), the BMU 140 concurrently (for example, simultaneously) turns off the first second-charge, the second second-charge, and the third second-charge switches 123, 124, and 125. Accordingly, the first to third battery units 111, 112, and 113 are connected to each other in parallel, and the mode of the battery management unit 140 is converted from the standby mode to the charge mode, thereby initializing charging.

Next, conversion from the standby mode to the discharge mode will be described with reference to FIG. 4. First, the battery management unit 140 turns on the first first-discharge switch 131 and, after a delay time (for example, a delay time of approximately 10 ms or less), turns on the second first-discharge switch 132. Then, after another delay time (for example, a delay time of approximately 10 ms or less), the battery management unit 140 turns on the second discharge switch 133. Accordingly, the first to third battery units 111, 112, and 113 are connected to each other in series, and the mode of the battery management unit 140 is converted from the standby mode to the discharge mode, thereby initializing discharging.

Next, conversion from the discharge mode to the charge mode will be described. First, the battery management unit 140 turns off the second first-discharge switch 132, and, after a delay time (for example, a delay time of approximately 10 ms or less), turns off the first first-discharge switch 131. Then, after another delay time (for example, a delay time of approximately 10 ms or less), the battery management unit 140 turns off the second discharge switch 133. It should be noted that in other embodiments, the battery management unit 140 may turn off the second discharge switch 133 first, followed by the second first-discharge switch 132 and the first first-discharge switch 131.

Next, after yet another delay time (for example, a delay time of approximately 10 ms or less), the battery management unit 140 turns on the first first-charge switch 121 and the second first-charge switch 122. Then, after still yet another delay time (for example, a delay time of approximately 500 ms or less), the BMU 140 concurrently (for example, simultaneously) turns on the first second-charge, second second-charge, and third second-charge switches 123, 124, and 125. Accordingly, the first to third battery units 111, 112, and 113 are connected to each other in parallel, and the mode of the battery management unit 140 is converted from the discharge mode to the charge mode, thereby initializing charging.

Next, conversion from the charge mode to the discharge mode will be described. The battery management unit 140 concurrently (for example, simultaneously) turns off the first second-charge, second second-charge, and third second-charge switches 123, 124, and 125. Then, after a delay time (for example, a delay time of approximately 10 ms or less), the BMU 140 concurrently (for example, simultaneously) turns off the first first-charge and second first-charge switches 121 and 122.

Next, after another delay time (for example, a delay time of approximately 10 ms or less), the battery management unit 140 turns on the first first-discharge switch 131 and, after yet another delay time (for example, a delay time of approximately 10 ms or less), turns on the second first-discharge switch 132. Then, after still yet another delay time (for example, a delay time of approximately 10 ms or less), the battery management unit 140 turns on the second discharge switch 133. Accordingly, the first to third battery units 111, 112, and 113 are connected to each other in series, and the mode of the battery management unit 140 is converted from the charge mode to the discharge mode, thereby initializing discharging.

In addition, the battery management unit 140 concurrently (for example, simultaneously) turns off the first second-charge to the third second-charge switches 123, 124, and 125 when over-charge or over-discharge current is detected during charging. Further, the battery management unit 140 turns off the second discharge switch 133 when over-charge or over-discharge current is detected during discharging. In other embodiments, the battery management unit 140 may turn off one of the first discharge switches 131 and 132.

According to an embodiment of the present invention, charging is performed by connecting the battery units 111, 112, and 113 in parallel, thereby reducing the overall charging time. In addition, discharging is performed by connecting the battery units 111, 112, and 113 in series, thereby enabling higher output discharging. Further, a delay time (for example, a predetermined delay time) is associated with controlling switching of each of charge/discharge switches, thereby driving circuit elements in a more stable manner during charging/discharging.

Although a few embodiments of the present invention have been shown and described, it would be appreciated by those skilled in the art that changes may be made to these embodiments without departing from the principles and spirit of the invention, the scope of which is defined in the claims and their equivalents.

What is claimed is:

1. A battery pack comprising:
  a plurality of battery units each comprising at least one battery cell;
  a plurality of charge switches configured to all turn on for connecting the plurality of battery units in a parallel configuration to form a charge path for charging the battery units during a charge mode of the battery pack when the battery units are charging, and the plurality of charge switches are further configured to all turn off for disconnecting the battery units from the parallel configuration during a standby mode of the battery pack when no charging or discharging of the battery units is performed and during a discharge mode of the battery pack when the battery units are discharging;
  a plurality of discharge switches separate from the charge switches and configured to all turn on for connecting the plurality of battery units in a series configuration to form a discharge path for discharging the battery units during the discharge mode and to all turn off for disconnecting the battery units from the series configuration during the standby mode and the charge mode; and
  a battery management unit for controlling switching of the charge switches and the discharge switches according to the charge mode, the discharge mode, and the standby mode, wherein the switching is controlled with a delay time associated with each of combinations of mode conversion between the modes.

2. The battery pack of claim 1, wherein each of the plurality of battery units further comprises a plurality of battery cells connected in series.

3. The battery pack of claim 1, wherein the plurality of charge switches comprises:
one or more first charge switches connected between negative electrode terminals of respective ones of the plurality of battery units and a negative electrode terminal of the battery pack; and
a plurality of second charge switches connected between a positive electrode charge terminal of the battery pack and positive electrode terminals of respective ones of the plurality of battery units.

4. The battery pack of claim 3, wherein the battery management unit is configured to convert the battery pack from the standby mode to the charge mode by
performing a first switching operation to turn on the one or more first charge switches, and
performing a second switching operation to turn on the plurality of second charge switches,
wherein a delay time is between the first switching operation and the second switching operation.

5. The battery pack of claim 3, wherein the plurality of discharge switches comprises:
one or more first discharge switches connected between a positive electrode terminal of respective ones of the plurality of battery units and a negative electrode terminal of respective neighboring ones of the plurality of battery units; and
a second discharge switch connected between a positive electrode terminal of one having a highest potential among the battery units connected in the series configuration, and a positive electrode discharge terminal of the battery pack.

6. The battery pack of claim 5, wherein the battery management unit is configured to convert the battery pack from the standby mode to the discharge mode by
performing one or more first switching operations to sequentially turn on the respective one or more first discharge switches, and
performing a second switching operation to turn on the second discharge switch,
wherein a delay time is
between the first switching operations and the second switching operation, and
between consecutive ones of the first switching operations sequentially performed on the respective one or more first discharge switches.

7. The battery pack of claim 5, wherein the battery management unit is configured to convert the battery pack from the discharge mode to the charge mode by
performing a first switching operation to turn off the second discharge switch,
performing one or more second switching operations to sequentially turn off the respective one or more first discharge switches,
performing a third switching operation to turn on the one or more first charge switches, and
performing a fourth switching operation to turn on the plurality of second charge switches, and
wherein a delay time is
between consecutives ones of the first to fourth switching operations, and
between consecutive ones of the second switching operations sequentially performed on the respective one or more first discharge switches.

8. The battery pack of claim 5, wherein the battery management unit is configured to convert the battery pack from the charge mode to the discharge mode by
performing a first switching operation to turn off the plurality of second charge switches,
performing a second switching operation to turn off the one or more first charge switches,
performing one or more third switching operations to sequentially turn on the respective one or more first discharge switches, and
performing a fourth switching operation to turn on the second discharge switch,
wherein a delay time is
between consecutive ones of the first to fourth switching operations, and
between consecutive ones of the third switching operations sequentially performed on the respective one or more first discharge switches.

9. The battery pack of claim 5, wherein the battery management unit is configured to turn off the second discharge switch when the plurality of battery units is over-discharged.

10. The battery pack of claim 3, wherein the battery management unit is configured to turn off the plurality of second charge switches when the plurality of battery units is over-charged.

11. The battery pack of claim 1, wherein the plurality of discharge switches comprises:
one or more first discharge switches connected between a positive electrode terminal of respective ones of the plurality of battery units and a negative electrode terminal of respective neighboring ones of the plurality of battery units; and
a second discharge switch connected between a positive electrode terminal of one among the battery units connected in the series configuration having a highest potential, and a positive electrode discharge terminal of the battery pack.

12. The battery pack of claim 11, wherein the battery management unit is configured to convert the battery pack from the standby mode to the discharge mode by
performing one or more first switching operations to sequentially turn on the respective one or more first discharge switches, and
performing a second switching operation to turn on the second discharge switch,
wherein a delay time is
between the first switching operations and the second switching operation, and
between consecutive ones of the first switching operations sequentially performed on the respective one or more first discharge switches.

13. The battery pack of claim 11, wherein the battery management unit is configured to turn off the second discharge switch when the plurality of battery units is over-discharged.

* * * * *